United States Patent [19]

Dey

[11] 4,326,014
[45] Apr. 20, 1982

[54] HIGH TEMPERATURE ORGANIC ELECTROLYTE CELLS

[75] Inventor: Arabinda N. Dey, Needham, Mass.

[73] Assignee: Duracell International Inc., Bethel, Conn.

[21] Appl. No.: 897,211

[22] Filed: Apr. 17, 1978

Related U.S. Application Data

[60] Division of Ser. No. 710,753, Aug. 2, 1976, Pat. No. 4,085,256, which is a continuation of Ser. No. 254,998, May 19, 1972, abandoned.

[51] Int. Cl.$^3$ .............................................. H01M 6/00
[52] U.S. Cl. ..................................... 429/48; 429/194; 427/58; 29/623.1
[58] Field of Search ......................... 427/58, 248, 255; 148/6.3; 429/218, 48, 194; 252/500, 518; 29/623.1

[56] References Cited

U.S. PATENT DOCUMENTS

| | | | |
|---|---|---|---|
| 3,578,500 | 5/1971 | Maricle et al. | 429/105 |
| 3,634,144 | 1/1972 | Hanawalt | 429/218 X |
| 4,069,375 | 1/1978 | Lauck | 429/218 |

*Primary Examiner*—Charles F. LeFevour
*Attorney, Agent, or Firm*—Ronald S. Cornell; Israel Nissenbaum

[57] ABSTRACT

An anode coating for anhydrous electrochemical generating cells is disclosed wherein the anode active material is immersed in an electrolyte solution and coated with the insoluble reaction product of the anode metal with an inhibiting reactant such as $CO_2$, $SO_2$, $O_2$, $NH_3$, and $N_2$ saturated with respect to water vapor. This coating is insoluble in the cell under open circuit conditions and is stable with regard to said electrolyte but is removable in said electrolyte, when the cell is discharged with a negligible over voltage. The coated anodes and the method for making same are specifically described. Cells with anodes treated according to this invention have been stored at 55° C., for extended periods with negligible self discharge.

5 Claims, No Drawings

HIGH TEMPERATURE ORGANIC ELECTROLYTE CELLS

This application is a division of Ser. No. 710,753 filed Aug. 2, 1976 now U.S. Pat. No. 4,085,256 which is a continuation of Ser. No. 254,998 filed May 19, 1972 now abandoned.

This invention relates to high energy density cells and more particularly to organic electrolyte cells having active metal anodes and cells which are capable for storage at elevated temperatures for extended periods.

In the development of electrochemical cells, research has been directed to improvement of several observable characteristics which determine practical cell value. These characteristics which include cell energy density, utilization or discharge efficiency of active cathode material, and cell shelf life, are dependent upon a multiplicity of factors each of which has been the subject of extensive past study.

Cell energy density, the product of cell capacity and operative voltage per weight of cell active materials, is determined primarily by the electric potentials in the cell, electrode materials and their capacities per unit weight. In the transition from aqueous electrolytes to organic electrolytes, a significant improvement in cell energy density has occurred. In particular, metals of the electrode-positive series i.e., those metals more electropositive than hydrogen and having such high negative electric potential as to decompose water and thereby being incompatible with aqueous electrolytes, have been found suitable for use as anodes when an organic liquid medium is used as the electrolyte. Cell output voltage, equal to the difference in electric tension of the cell cathode and anode has been increased accordingly. Cell current capability is largly dependent upon ion transfer between the anode and cathode and upon the cathode conductivity. With respect to ion transfer, this factor is largly dependent upon the reducing power of the anode material, the ionic conductivity of the electrolyte and the oxidizing power of the active cathode materials. Recent research has developed cells employing anode materials and organic electrolytes which exhibit excellent ion transfer characteristics. Patent applications have been filed for cells utilizing the anode materials and certain specific organic electrolytes. United States patent applications Ser. No. 829,849 now abandoned, and Ser. No. 853,312, now U.S. Pat. No. 3,808,052 and others, are directed to such organic electrolyte cells.

The inhibition of the self discharge at high temperatures according to this invention is accomplished by treating the active metal anodes of the cells in a solution of the electrolyte through which is bubbled, in gaseous form, certain reactants which form a coating layer upon the anode which has been observed to be insoluble in the electrolyte during open circuit storage of cells containing so-treated anodes. Upon being subjected to the slight over voltage resulting from the closing of the circuit, the coating layer is removed and has not been found to interfere materially with either the capacity or initiation time of the cell. Among the most effective electrodes for which such a treatment is useful are those active elements and anodic materials lying above hydrogen in the electromotive series and are those which will displace hydrogen from aqueous solutions. Most useful among such materials are the light onetals which comprise magnesium, lithium, sodium, potassium, and calcium. All the above are particularly useful in high energy density electrochemical organic electrolyte cells. Preferred and most useful in the present invention are the lithium anodes.

The prior art organic electrolyte cells have shown good stability and long shelf-like on storage at ambient temperatures. However, on prolonged storage at elevated temperatures, such cells have shown signs of deterioration. While each component separately, i.e. the cathode with electrolyte and the anode with electrolyte was shown to be stable at even high temperatures, when they were combined and assembled into a cell, such cells were found to be unstable during high temperature storage. It has been postulated that the self discharge of the cathodes were enhanced by interactions of the cathode with the anode via the electrolyte at elevated temperatures.

SUMMARY OF THE INVENTION

It is an object of this invention to provide high energy density primary organic electrolyte cells.

It is a further object to provide such high energy density cells having prolonged shelf-like on elevated temperature storage.

The above and other objects of this invention are achieved by the utilization of a novel anode treatment, that forms a heat stable, insoluble film on the anodes, the anodes resulting from such treatment and the cells utilizing such anodes.

Among the reactants for the treatment most suitable for forming an electrolyte open circuit insoluble film upon the anodic materials are inhibitor gases including: $CO_2$, $SO_2$, $O_2$, $NH_3$, and, $N_2$ saturated with respect to water vapor.

The inhibition of self discharge according to this invention is preferably accomplished by pre-treating the anode material in the electrolyte to be used in the final cell through which is bubbled the reactant gas. Characteristically, most of the preferred reactants or inhibitor compounds are only slightly soluble in the preferred electrolyte materials. Further when the anodes are treated with the reactant in the electrolyte it has been noted that a film is formed upon the surface of the anode metal and that after the initial film or coating of the reactant upon the anode material has been formed there appears to be no sub-surface penetration of the film material. This is probably due to the fact that the film material is only very slightly soluble in the electrolyte in the absence of any electromotive potential. However, the coating is rapidly removed in the electrolyte proper under the application of a slight overvoltage. Since the coating layer is of mineral thickness, in the order of probably only several molecules, it does not, to any appreciable extent, interfere with the onset of the discharge reaction or with the total capacity of the cell.

From the above it is clear that the lithium anode or any of the other active metal anodes are not passivated, since they can be discharged with a negligible overvoltage. The open circuit coupling reaction via the electrolyte between the cathode and anode is prevented. This theory appears consistent with the observed facts.

The invention will be more fully described in connection with the following examples.

EXAMPLE 1

The inhibition of self discharge was accomplished by pre-treating a group of lithium anodes in an electrolyte through which $CO_2$ was bubbled. The electrolyte consisted of 1 molar LiClO$_4$ in tetrahydrofuran. These anodes were then mounted in standard test cells. The cells were sealed and stored in thermostatic controlled ageing cabinets for 30 days at 55° C. The cells were prepared with the various cathode couples. Those included are the depolarizers which are substantially insoluble in the organic electrolyte such as molybdic oxide, vanadium oxide, various metal chromates, silver permanganates, ammonium molybdate, silver periodate, and in all cases the anode-cathode couples were protected and the cells showed negligible self discharge.

EXAMPLE 2

A same procedure described in Example 1, was used to treat anodes of lithium, but the solvent was changed from tetrahydrofuran to propylene carbonate in the first instance and acetonitrile in the second. Anodes treated in these solvents in which was dissolved 1 molar lithium perchlorate electrolyte and subjected to the carbon dioxide bubbling action similarly provided cells stable at high temperatures.

EXAMPLE 3

A battery containing lithium anodes prepared according to example 1, was assembled from lithium-molybdic oxide electrodes in an electrolyte comprising 1 molar lithium perchlorate dissolved in tetrahydrofuran propylene carbonate (1:1) as the electrolyte. The battery was stored for thirty-five days in the high temperature storage cabinet at 55° C. Upon subsequent discharge, it was found to have undergone only negligible self discharge. The nominal capacity of the battery was exceeded and the cell performed normally at low and high potential discharge rates.

EXAMPLE 4

Lithium anodes was treated in a manner similar to that described in Example 1, but instead of carbon dioxide, SO$_2$ was bubbled through the solvent. Cells prepared under these conditions showed good high temperature stability upon high temperatures.

EXAMPLE 5

Lithium anodes were treated in a manner similar to that described in Example 1, but instead of carbon dioxide ammonia (NH$_3$), was bubbled through the solvent. The ammonia gas contained slight traces of oxygen.

The cells after accelerated storage test as described in Example 1 showed comparable qualities.

EXAMPLE 6

Lithium anodes were treated in a manner similar to that described in Example 1, but instead of CO$_2$ traces of moisture were introduced by bubbling nitrogen, saturated with respect to water vapor, through the electrolyte mixture. In Examples 4, 5 and 6 the cells assembled from so-treated anodes all displayed good capacities after high temperature storage.

What is claimed is:

1. The method of treating anodes of active metals above hydrogen in the electromotive series for use in anhydrous electrochemical energy generating cells comprising the steps of immersing the active metal in an anhydrous organic electrolyte comprised of an organic solvent with an electrolyte salt dissolved therein and having a gaseous reactant selected from the group consisting of CO$_2$, SO$_2$, O$_2$, NH$_3$, and N$_2$ saturated with respect to water vapor bubbled therethrough; forming upon the surface of said active metal, with said gaseous reactant in the presence of the electrolyte, a coating of the reaction product of said active metal with said reactants; said coating being insoluble in said cell on open circuit but removable under the slight overvoltage conditions during discharge of said cell.

2. The method according to claim 1, wherein the anode is lithium.

3. The method according to claim 1, wherein the reactant is CO$_2$.

4. The method according to claim 1, wherein the electrolyte is selected from the group selected of organic solvents including tetrahydrofuran, propylene carbonate, dimethyl sulfoxide, dimethyl formamide, gamma-butyrolactone, dimethy carbonate, N-N nitrosodimethylamine, acetonitrile, dimethyl sulfite, N:N dimethyl formamide and mixtures thereof having dissolved therein electrolyte salts such as the chloride, bromide, iodide, perchlorate, hexafluorophosphate, tetrafluoroborate, hexafluoroarsenate, tetrachloroaluminate of said active metal.

5. The method according to claim 4, wherein the electrolyte is tetrahydrofuran having dissolved therein 1 mole of lithium perchlorate (LiClO$_4$).

* * * * *